United States Patent Office 3,519,607
Patented July 7, 1970

3,519,607
POLYMERIZATION OF VINYL
PHOSPHORYL COMPOUNDS
Frank J. Welch, Charleston, W. Va., assignor to Union
Carbide Corporation, a corporation of New York
No Drawing. Filed June 29, 1962, Ser. No. 206,151
Int. Cl. C08f 3/00
U.S. Cl. 260—80                                11 Claims

ABSTRACT OF THE DISCLOSURE

A vinyl phosphoryl compound of the formula:

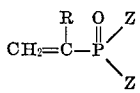

wherein R is hydrogen or the methyl radical and Z is
—OR′, —SR′, —N(R′)$_2$— or —R′, wherein R′ is a
saturated or olefinically unsaturated aliphatic or mono-
cyclic aromatic radical, is polymerized to a solid moldable
product by contacting the monomer at a temperature
of from —80° C. to +100° C. with a catalyst of the
formula R″MgX wherein R″ is as defined above by R′ and X is halogen
or R″.

The present invention relates to organic polymerization
processes and products, and is especially concerned with
an improved process for the polymerization of vinyl-
phosphoryl compounds, i.e., compounds containing the

group, whereby high molecular weight, solid polymer
products are obtained. The invention is also concerned
with certain of the aforementioned polymer products as
novel compositions of matter.

More particularly, the polymerizable vinylphosphoryl
compounds contemplated by this invention can be repre-
sented by the general formula:

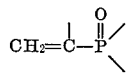

wherein R is either hydrogen or a methyl radical and Z
is selected from the group consisting of the —OR′, —SR′,
—N(R′)$_2$ and —R′ radicals, R′ being selected from the
group consisting of the saturated and olefinically unsatu-
rated acyclic and cyclic aliphatic and monocyclic aro-
matic hydrocarbyl radicals containing up to 8 carbon
atoms, and in the case of the non-aromatic hydrocarbyl
radicals, preferably up to 4 carbon atoms. In addition,
the hydrocarbyl radical R′ can be substituted by atoms or
other radicals which are inert during the practice of this
invention, such as halogen atoms, particularly chlorine
or bromine atoms, and the like.

Thus, the vinylphosphoryl compounds of this invention
include, for instance, the phosphonates of the formula:

II
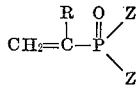

the phosphonodithioates of the formula:

III
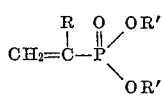

the diamidophosphonates of the formula:

IV
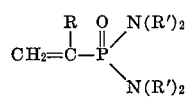

and the phosphine oxides of the formula:

V
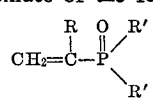

wherein R is hydrogen or a methyl radical and R′ is a
hydrocarbyl or substituted hydrocarbyl radical as here-
inabove defined. By way of illustration, R′ can be a linear,
branch-chained or cyclic alkyl or haloalkyl radical, such
as a methyl, ethyl, n-butyl, isobutyl, hexyl, 2-ethylhexyl,
n-octyl, cyclohexyl, 2-chloroethyl or 4-bromobutyl radi-
cal, etc.; a linear, branch-chained or cyclic alkenyl radical,
such as a vinyl, allyl, isopropenyl, butenyl, octenyl, or
cyclopentenyl radical, etc.; an aryl radical, such as a
phenyl, tolyl, xylyl radical. etc.; or an aralkyl radical,
such as a benzyl, or phenylethyl radical, etc.

As typical of the vinylphosphoryl compounds which
are contemplated by this invention, there can be men-
tioned:

dimethyl vinylphosphonate
diethyl vinylphosphonate
di-n-butyl vinylphosphonate
diisobutyl vinylphosphonate
dihexyl vinylphosphonate
di(2-ethylhexyl) vinylphosphonate
di-n-octyl vinylphosphonate
dicylclohexyl vinylphosphonate
di(2-chloroethyl) vinylphosphonate
di(4-bromobutyl) vinylphosphonate
diallyl vinylphosphonate
diphenyl vinylphosphonate
ditolyl vinylphosphonate
dibenzyl vinylphosphonate
dimethyl isopropenylphosphonate
diisobutyl isopropenylphosphonate
di-n-octyl isopropenylphosphonate
dicyclohexyl isopropenylphosphonate
di(2-chloroethyl) isopropenylphosphonate
diallyl isopropenylphosphonate
diphenyl isopropenylphosphonate
dibenzyl isopropenylphosphonate
dimethyl vinylphosphonodithioate
diethyl vinylphosphonodithioate
diisobutyl vinylphosphonodithioate
di-n-octyl vinylphosphonodithioate
dicyclohexyl vinylphosphonodithioate
di(2-chloroethyl) vinylphosphonodithioate
diallyl vinylphosphonodithioate
diphenyl vinylphosphonodithioate
ditolyl vinylphosphonodithioate
dibenzyl vinylphosphonodithioate
dimethyl isopropenylphosphonodithioate
diisobutyl isopropenylphosphonodithioate
di-n-octyl isopropenylphosphonodithioate
dicyclohexyl isopropenylphosphonodithioate
di(2-chloroethyl) isopropenylphosphonodithioate
diallyl isopropenylphosphonodithioate
diphenyl isopropenylphosphonodithioate
dibenzyl isopropenylphosphonodithioate
N,N,N′,N′-tetramethyldiamido vinylphosphonate
N,N,N′,N′-tetraethyldiamido vinylphosphonate
N,N,N′,N′-tetraisobutyldiamido vinylphosphonate
N,N,N′,N′-tetra-n-octyldiamido vinylphosphonate
N,N,N′,N′-tetra(2-chloroethyl)diamido vinylphosphonate
N,N,N′,N′-tetraallyldiamido vinylphosphonate
N,N,N′,N′-tetraphenyldiamido vinylphosphonate N,N,N',N'-tetratolyldiamido vinylphosphonate
N,N,N',N'-tetrabenzyldiamido vinylphosphonate
N,N,N',N'-tetramethyldiamido isopropenylphosphonate
N,N,N',N'-tetraisobutyldiamido isopropenylphosphonate
N,N,N',N'-tetra-n-octyldiamido isopropenylphosphonate
N,N,N',N'-tetra(2-chloroethyl)diamido isopropenyl-
  phosphonate
N,N,N',N'-tetraallyldiamido isopropenylphosphonate
N,N,N',N'-tetraphenyldiamido isopropenylphosphonate
N,N,N',N'-tetrabenzyldiamido isopropenylphosphonate
dimethylvinylphosphine oxide
diethylvinylphosphine oxide
diisobutylvinylphosphine oxide
diisobutylvinylphosphine oxide
di-n-octylvinylphosphine oxide
dicyclohexylvinylphosphine oxide
di(2-chloroethyl)vinylphosphine oxide
diallylvinylphosphine oxide
diphenylvinylphosphine oxide
ditolylvinylphosphine oxide
dibenzylvinylphosphine oxide
dimethylisopropenylphosphine oxide
diisobutylisopropenylphosphine oxide
di-n-octylisopropenylphosphine oxide
dicyclohexylisopropenylphosphine oxide
di(2-chloroethyl)isopropenylphosphine oxide
diallylisopropenylphosphine oxide
diphenylisopropenylphosphine oxide
dibenzylisopropenylphosphine oxide, and the like.

Moreover, mixtures of vinylphosphoryl compounds or compounds in which R or R' above is independently selected from the group designated can also be polymerized in accordance with the improved process of this invention.

The vinylphosphoryl compounds contemplated by this invention can be obtained initially in any convenient manner. For instance, the phosphonates represented above by Formula II can be prepared by the reaction of the corresponding phosphoryl dichloride, i.e., the compound of the formula:

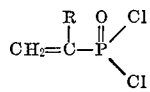

with at least a stoichiometric amount of an alcohol of the formula R'OH, R and R' being as hereinabove defined, in the presence of a basic catalyst. Similarly, the phosphonodithioates represented above by Formula III can be prepared by the reaction of the phosphoryl dichloride with a mercaptan of the formula R'SH; while the diamidophosphonates represented above by formula IV can be prepared by the reaction of the phosphoryl dichloride with a secondary amine of the formula (R')₂NH. On the other hand, the phosphine oxides represented above by Formula V can be prepared by the reaction of a dihydrocarbylchlorophosphine of the formula:

with vinylmagnesium chloride, followed by oxidation with hydrogen peroxide, to produce a vinylphosphine oxide; or with propylene oxide, followed by thermal isomerization and then dehydrohalogenation, to produce an isopropenylphosphine oxide. In this connection, it is also to be noted, that the isopropenylphosphine oxides are considered to be novel compositions of matter.

Although the vinylphosphoryl group

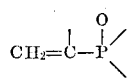

bears some structural similarity to the readily polymerizable acryl group,

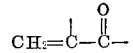

vinylphosphoryl compounds do not readily respond to conventional polymerization techniques. Thus, while copolymers containing minor amounts of vinylphosphoryl compounds together with other polymerizable monomers such as styrene, ethyl acrylate, and butadiene, etc., can be produced readily by standard free radical catalyzed or initiated polymerizations, homopolymers of the vinylphosphoryl compounds are very difficult to prepare using such techniques. In certain instances, by specifically employing the more active free radical catalysts, such as benzoyl peroxide or di-tert-butyl peroxide, etc., significant conversions to a homopolymer product can be obtained at relatively high temperatures above about 100° C. However, the homopolymer products thereby formed are ordinarily low molecular weight oils or tacky gums, while at lower polymerization temperatures or using other free radical catalysts, the rate of polymerization and/or the degree of conversion to polymer is frequently insufficient to warrant commercial application of the process.

Unexpectedly, it has now been found that high conversions of the vinylphosphoryl compounds to normally solid, high molecular weight polymer products can readily be obtained by contacting the monomer, alone or together with a minor amount of a copolymerizable monomer, at a temperature in the range of from about −80° C. to about +100° C. and in an inert atmosphere, with a catalytic amount of an organometallic compound of the formula:

R"MgX wherein R" is a hydrocarbyl radical as defined above by R'; and X is either a halogen atom, preferably a chlorine, bromine or iodine atom, or the hydrocarbyl radical R". The preferred hydrocarbyl radicals in this regard are the saturated aliphatic and monocyclic aromatic hydrocarbyl radicals, such as the alkyl, aryl and aralkyl radicals, etc., while olefinically unsaturated aliphatic hydrocarbyl radicals, such as the alkenyl radicals, etc., are also within the contemplation of this invention.

As typical of the catalysts contemplated by this invention, there can be mentioned:

methylmagnesium chloride
ethylmagnesium bromide
n-butylmagnesium chloride
isobutylmagnesium iodide
2-ethylhexylmagnesium iodide
n-octylmagnesium chloride
cyclohexylmagnesium chloride
vinylmagnesium chloride
allylmagnesium chloride
phenylmagnesium chloride
benzylmagnesium bromide
tolylmagnesium iodide
dimethylmagnesium
diethylmagnesium
diisobutylmagnesium
di-n-octylmagnesium
dicyclohexylmagnesium
divinylmagnesium
diphenylmagnesium
dibenzylmagnesium
ditolylmagnesium, and the like.

In the practice of the polymerization process of this invention, the catalyst and monomer, i.e., the vinylphosphoryl compound, can be brought into contact in any convenient manner, and thereafter maintained at a temperature within the range of from about −80° C., or somewhat lower, to about +100° C., and preferably from about −80° C. to about +50° C., for a period of time sufficient to produce the polymer of this invention. The polymerization period can, in fact, vary broadly, and is readily determinable by one skilled in the art in light of this disclosure. Particularly satisfactory results can be obtained for instance, by carrying out the polymerization for a period of from about 30 minutes to about 24 hours, depending to a certain extent upon the catalyst and monomer concentrations present, as well as upon the polymerization temperature. Moreover, while autogenous pressure is most conveniently employed, the polymerization can also be carried out under increased pressures of up to about 10,000 atmospheres.

Since the rate of polymerization attained by the process of this invention is usually very rapid, it is also preferable to carry out the polymerization in the presence of a suitable inert diluent which is more preferably a solvent for both the catalyst and for the monomer, particularly the former. Thus, while the polymerization process of this invention can be bulk, in which extraneous diluents are absent, an organic suspension or solution polymerization, in which a diluent is incorporated in the reaction mixture is preferably conducted. Suitable diluents, include, for instance, hydrocarbons such as toluene, benzene, and methyl cyclohexane, etc.; tertiary amines such as triethylamine, and pyridine, etc.; ethers such as tetrahydrofuran, diethyl ether, and ethylene glycol dimethyl ether, etc.; and the like. To this end, either or both the monomer and the catalyst is best admixed with the diluent prior to their admixture with each other. The diluent thereby aids the transfer of heat evolved during the polymerization. The diluent also serves as a medium for the dispersal of the polymer product, thereby facilitating the agitation of the product during the polymerization, as well as the subsequent recovery of the product.

The amount of catalyst employed can be varied broadly, any catalytic amount thereof being operable. Such amount, it is to be noted, can also readily be determined by one skilled in the art in light of this disclosure. Moreover, particularly good results can be obtained in this connection using catalyst concentrations of from about 0.1 percent, or slightly lower to about 5 percent by weight, based upon the weight of the monomer. Similarly, the concentration of monomer in the total amount of diluent present, when a diluent is employed, can vary broadly, with particularly satisfactory results being obtained using a monomer concentration of from about 10 percent, or slightly lower, to about 50 percent by weight, based upon the weight of the diluent, including any solvent for the catalyst.

In addition, since the catalyst of this invention, in and of themselves, are ordinarily very reactive compounds, it is essential to carry out the reaction in an inert atmosphere so as to avoid contamination of the polymerization system by substances such as air and water which may react with the catalyst and destroy it. Consequently, the monomer, diluent and reactor to be employed in the polymerization are preferably initially dried and purged with nitrogen or other inert gas, and care is taken to maintain an inert atmosphere during the polymerization.

Upon completion of the polymerization, the polymer product can be recovered in any convenient manner, such as by precipitation upon addition to a liquid which is non-solvent for the product, but which is a solvent for the monomer, as for instance, n-butyl chloride in the case of phosphonate polymers. The polymer product can also be recovered upon stripping off the diluent and any unreacted monomer present.

Unlike the homopolymers of vinylphosphoryl compounds produced by free-radical polymerization techniques, which, as indicated above, generally vary from viscous liquids to tacky gums, the novel homopolymers of this invention are characterized by having increased orientation and sterospecificity, and are ordinarily high-softening, normally solid, i.e., non-tacky, non-flowing, products which can be molded into flexible to hard plaques having a high degree of flame resistance as well as resistance to discoloration upon heating. In particular, the polymers produced from the phosphine oxides represented above by Formula V have a softening point above 100° C., and most frequently at least about 150° C., and in addition, evidence a substantial degree of crystallinity. The polymer products of this invention can subsequently be employed to produce molded articles, fibers, films, solid coatings, etc., uses, it is to be noted, which are for the most part precluded for the homopolymers produced by conventional free radical polymerization techniques.

The term "reduced viscosity" as used herein defines the value obtained by dividing the specific viscosity of a solution of the polymer by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of N,N-dimethylformamide, at a temperature of 30° C. The reduced viscosity of a polymer, it is to be noted, is conventionally taken by those skilled in the art as a measure of the molecular weight of the polymer, with a higher reduced viscosity value indicating a higher molecular weight product. In this connection, the solid polymers of this invention generally have a reduced viscosity of at least about 0.02.

The term "softening point," as used herein defines the temperature at which a polymer, in powdered form, softens and agglomerates on a melting block, and at which a thin plaque of the polymer can be bent or folded on the melting block without breaking. The softening point of a polymer thus approximates the glass-transition temperature of the polymer, i.e., the temperature at which a characteristic change in physical properties from those of a solid, relatively hard, rigid, and usually glossy polymer to those of a soft, flexible, rubbery polymer occur.

The present invention can be further illustrated by the following specific examples.

EXAMPLE I

A solution containing 26 grams of di(2-chloroethyl) vinylphosphonate in 60 milliliters of anhydrous toluene was placed in a dry 125-milliliter flask. The flask and the contents therein were purged with nitrogen and cooled to a temperature of 0° C., whereupon 5 milliliters of a 3 molar solution of butylmagnesium chloride in diethyl ether were added to the flask in small increments, accompanied by stirring, over a 4-hour period. The reaction mixture was then stirred for an additional hour and poured into about 0.4 liter of n-butyl chloride to precipitate the poly[di(2-chloroethyl) vinylphosphonate] product thus formed. The product was thereafter separated by decantation, washed with n-butyl chloride, filtered, and dried. In this manner 21 grams of poly[di(2-chloroethyl) vinylphosphonate] were obtained as a white solid. The polymer was soluble in dimethylformamide and tetrahydrofuran. A strongly adherent film of the polymer was cast on glass from a dimethylformamide solution. In addition, the polymer was pressed into a flexible plaque at a temperature slightly below 150° C., and evidenced no thermal discoloration at temperatures up to about 250° C.

For comparison purposes, 13 grams of di(2-chloroethyl) vinylphosphonate and 0.1 gram of a conventional free radical catalyst, viz, benzoyl peroxide, were charged to a nitrogen-purged Pyrex tube, which was then sealed and rotated in a water bath at a temperature of 50° C., for 23 hours. The polymer product thus formed was recovered as described above. In this manner, 6.5 grams of poly[di(2-chloroethyl) vinylphosphonate] were obtained as a tacky gum which flowed slowly at room temperature. Thus, the physical properties of this polymer were markedly different from those of the polymer produced by the process of this invention as described above in this example, and were such that the polymer could not be used in molding applications, etc.

EXAMPLE II

A series of experiments were conducted to illustrate the use of various catalysts for the polymerization of di(2-chloroethyl) vinylphosphonate in accordance with the process of this invention. In each run, a 100-milliliter flask was heated to a temperature of about 100° C. under vacuum to remove air and any water present. The flask was purged with nitrogen and cooled to room temperature. A solution of the monomer in a diluent, except where otherwise indicated, was introduced into the flask by nitrogen pressure from a reservoir in which the monomer had been dried by storage over calcium hydride. After the monomer solution was brought to the desired polymerization temperature, a solution of the catalyst was slowly added thereto from a syringe and through an opening in the flask which was sealed with a serum cap. During the addition of catalyst and for a period thereafter, polymerization occurred, and stirring was continually applied to the contents of the flask. Upon completion of the polymerization period, the homopolymeric product thereby formed, i.e., poly[di(2-chloroethyl) vinylphosphonate], was recovered as described above in Example I. The materials and reaction conditions employed are tabulated below in Table A.

EXAMPLE V

In the manner described above in Example II, 8 grams of N,N,N',N'-tetramethyldiamido vinylphosphonate in 25 milliliters of toluene were polymerized at a temperature of about −78° C., using 3 milliliters of a 1 molar butylmagnesium chloride solution in diethyl ether as the catalyst. After 4 hours, the reaction mixture was warmed to room temperature, whereupon the heat evolved during the polymerization caused the temperature to rise to 40° C. The polymer thus formed was precipitated, washed in heptane, separated by decantation and filtration, and dried. In this manner, 8 grams of poly[N,N,N',N'-tetramethyldiamido vinylphosphonate] were obtained as a solid. The polymer had a softening point above 100° C. and a reduced viscosity of 0.13. The polymer was subsequently molded into a plaque at a temperature of 150° C. In similar manner, N,N,N',N''-tetrabenzyldiamido vinylphosphonate and N,N,N',N'-tetraallyldiamido vinylphosphonate are independently polymerized to yield solid, moldable polymers. In contrast therewith, a 45 percent yield of the polymer was obtained as a sticky gum by polymerizing the monomer at a temperature of about 50° C. using a conventional free radical catalyst, viz., 2,2'-azobis(2-methylpropionitrile) as the catalyst.

TABLE A

| Run | Wt of monomer (g.) | Diluent | Catalyst | Temperature, °C. | Total polymerization time (hrs.) | Yield (g.) | Reduced viscosity |
|---|---|---|---|---|---|---|---|
| 1 | 15 | 35 ml. pyridine | 7 ml. of 1 M ethylmagnesium chloride in diethyl ether. | −30 | 5 | 12 | 0.14 |
| 2 | 46 | None | 20 ml. of 0.5 M butylmagnesium chloride solution in diethyl ether. | −10 | 0.5 | 20 | 0.15 |
| 3 | 22 | 67 ml. toluene | 7 ml. of 1.4 M phenylmagnesium bromide solution in diethyl ether. | −70 to −50 | 4 | 16 | 0.10 |
| 4 | 19 | 58 ml. toluene | 9 ml. of 1.0 M vinylmagnesium chloride solution in tetrahydrofuran. | −70 | 7 | 13 | 0.09 |
| 5 | 25 | do | 4.0 ml. of 0.5 M dibutylmagnesium solution in diethyl ether. | −78 | 24 | 13 | 0.24 |

EXAMPLE III

In the manner described above in Example II, 12 grams of diethyl vinylphosphonate in 60 milliliters of tetrahydrofuran were polymerized at a temperature of about −78° C. using 4 milliliters of a 1 molar butylmagnesium chloride solution in diethylether as the catalyst. After a polymerization period of 18 hours, the solvent present was evaporated by heating on a steam bath under vacuum. In this manner, about 12 grams of poly[diethyl vinylphosphonate] were obtained as a solid. The polymer had a reduced viscosity of 0.15, and was soluble in dimethylformamide, methanol, benzene and tetrahydrofuran. The polymer was subsequently molded into a flexible plaque at a temperature of 100° C.

EXAMPLE IV

In the manner described above in Example II, 20 grams of diphenyl vinylphosphonate in 60 milliliters of toluene were polymerized at a temperature of about −30° C. using 4 milliliters of a 1 molar butylmagnesium chloride solution in diethyl ether as the catalyst. After a polymerization period of 24 hours, the solvent and unreacted monomer present were removed by distillation under reduced pressure. The polymeric residue was dissolved in acetone, precipitated in diethyl ether, separated by filtration, and dried. In this manner, 3.5 grams of poly[diphenyl vinylphosphonate] were obtained as a solid. The polymer had a softening point of about 100° C. and a reduced viscosity of 0.05. The polymer was subsequently molded into a hard plaque at a temperature of 150° C. In similar manner, diethyl isopropenylphosphonate, and diallyl isopropenylphosphonate are independently polymerized to yield solid, moldable homopolymers.

EXAMPLE VI

In the manner described above in Example II, 11 grams of diethyl vinylphosphonodithioate in 30 milliliters of toluene were polymerized at a temperature of about −78° C. using 2.5 milliliters of a 1 molar butylmagnesium chloride solution in diethyl ether as the catalyst. After a polymerization period of 7 hours, the polymer thus formed was precipitated in butyl chloride, washed with heptane, separated by decantation and filtration, and dried. In this manner, 6 grams of poly[diethyl vinylphosphonodithioate] were obtained as a solid. The polymer had a reduced viscosity of 0.11. The polymer was subsequently molded into a plaque at a temperature of 150° C. In contrast therewith, a twenty percent yield of the polymer was obtained as a viscous oil by polymerizing the monomer at a temperature of about 50° C. using 2,2'-azobis(2-methylpropionitrile) as the catalyst. In similar manner, dibenzyl vinylphosphonodithioate and diallyl vinylphosphonodithioate are independently polymerized to yield solid, moldable homopolymers.

EXAMPLE VII

In the manner described above in Example II, 9 grams of dibutylvinylphosphine oxide in 30 milliliters of toluene were polymerized at a temperature of about −12° C. using 7 milliliters of a 1 molar butylmagnesium chloride solution in diethyl ether as the catalyst. After a polymerization period of 1 hour, the polymer thus formed as a precipitate was separated by decantation, washed with diethyl ether, and dried. In this manner, 8 grams of poly[dibutylvinylphosphine oxide] were obtained as a solid. The polymer had a softening point of about 180° C., a reduced viscosity of 0.14, and was at least partially crystalline as evidenced by X-ray diffraction. The polymer was subsequently molded into a plaque at a temperature of 250° C. In similar manner, dibutylvinylphosphine oxide is polymerized in high yield to a solid moldable homopolymer independently using the other catalysts described above in Example II.

For comparison purposes, 99 grams of di-n-butylvinylphosphine oxide and 1 gram of di-tert-butyl peroxide were charged to a nitrogen purged flask and heated to a temperature of 150° C. The polymerization reaction was exothermic as the temperature increased to 240° C. The excess monomer was removed by distillation under reduced pressure and the polymer product, a viscous oil, was recovered from the residue by extraction three times with hexane. In this manner, 79 grams of poly[di-n-butylvinylphosphine oxide] were obtained. The product had a reduced viscosity of 0.03 in benzene at 2 percent concentration, and was soluble in benzene, ethyl acetate and acetone. The properties of this polymer were markedly different from those of the polymer produced by the process of this invention as described above in this example, and were such that the polymer could not be used in molding applications. Moreover, di-n-butylvinylphosphine oxide could not be polymerized appreciably with benzoyl peroxide, azobisisobutyronitrile, or other conventional radical initiators at temperatures below 100° C., while at higher temperatures, rates of polymerization are slow, and low yields of polymer are obtained.

EXAMPLE VIII

In the manner described above in Example II, 5 grams of diphenylvinylphosphine oxide in 30 milliliters of tetrahydrofuran were polymerized at a temperature of about 25° C. using 9 milliliters of a 1 molar butylmagnesium chloride solution in diethyl ether as the catalyst. After a polymerization period of one hour, the polymer thus formed as a precipitate was separated by filtration, washed twice with tetrahydrofuran, and dried. In this manner, 5 grams of poly[diphenylvinylphosphine oxide] were obtained as a solid. The polymer had a softening point above 250° C., and a reduced viscosity of 0.06. The polymer was subsequently molded into a plaque at a temperature of about 250° C., and was suitable for use in the production of synthetic textile fibers. In contrast therewith, poly[diphenylvinylphosphine oxide], produced using di-tert-butyl peroxide as a catalyst as described above in Example VII, was recovered as a solid having a softening point of 84° C., thus precluding the satisfactory use of the polymer in the production of synthetic textile fibers. Such use, it is to be noted, ordinarily requires polymers having a softening point above the boiling point of water, and preferably at least in the range of 150° C. to 250° C.

EXAMPLE IX

To a solution of 234 grams of diphenylchlorophosphine in 250 milliliters of xylene, 87 grams of propylene oxide were slowly added, accompanied by stirring, over a period of two hours, at the temperature maintained in the range of from 50° C. to 60° C. In this manner, a solution of diphenyl(2-chloropropyl)phosphinite, i.e., the compound of the formula:

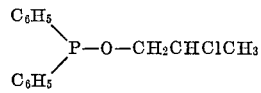

was produced. The solution was stirred for an additional two hours to insure a complete reaction, and then heated at a temperature of 150° C. for a period of three hours to isomerize the phosphinite in solution to diphenyl(1-chloromethylethyl)phosphine oxide, i.e., the compound of the formula:

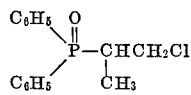

The solution was then cooled to room temperature and, after standing for a period of about 12 hours, 150 grams of triethylamine were added thereto and the resulting solution was refluxed at a temperature of 90° C. for a period of three hours. In this manner, the phosphine oxide was dehydrohalogenated to diphenylisopropenylphosphine oxide. A slurry was thus produced, and was cooled to 60° C., followed by the addition of 200 milliliters of 10 percent sodium hydroxide to neutralize the triethylamine hydrochloride formed in the reaction. The resulting mixture was then filtered, the organic layer was separated, and the solvent, xylene, was removed under reduced pressure at a temperature of 50° C. The residue, weighing 161 grams, was thereafter distilled to a pot temperature of 200° C. under a reduced pressure of 1 millimeter of mercury to yield 65 grams of a distillate which crystallized upon cooling. A 27-gram portion of this distillate was finally redistilled at a lower pressure to yield 24 grams of diphenylisopropenylphosphine oxide in the form of a crystalline solid having a melting point in the range of 118–120° C.

*Analysis.*—Calculated for $C_{15}H_{16}PO$ (percent): C, 74.4; H, 6.2; P, 12.8. Found (percent): C, 74.3; H, 6.6; P, 121.1.

EXAMPLE X

In the manner described above in Example II, 4 grams of diphenylisopropenylphosphine oxide in 20 milliliters of tetrahydrofuran were polymerized at a temperature of about 30° C. using 3.9 milliliters of a 1.5 molar butylmagnesium chloride solution in diethyl ether as the catalyst. After a polymerization period of 5 hours, the polymer thus formed as a precipitate was separated by filtration, washed twice with diethyl ether, and dried. In this manner, 4 grams of poly[diphenylisopropenylphosphine oxide] were obtained as a solid. The polymer had a softening point of about 200° C. and a reduced viscosity of 0.04 in ethylene dichloride. The polymer was subsequently molded into a plaque. In similar manner, diallylisopropenylphosphine oxide and diethylisopropenylphosphine oxide are independently polymerized to yield solid, moldable homopolymers.

What is claimed is:

1. The process for the polymerization of vinylphosphoryl compounds of the formula:

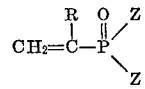

wherein R is selected from the group consisting of hydrogen and the methyl radical, and Z is selected from the group consisting of the —SR', and —R' radicals, R' being selected from the group consisting of the saturated and olefinically unsaturated aliphatic and monocyclic aromatic hydrocarbyl and halogen-substituted hydrocarbyl radicals containing up to 8 carbon atoms, which process comprises bringing said vinylphosphoryl compound into admixture, in an inert atmosphere, with from about 0.1 to about 5 percent by weight thereof of catalyst of the formula:

wherein R" is selected from the group consisting of the saturated and olefinically unsaturated aliphatic and monocyclic aromatic hydrocarbyl radicals containing up to 8 carbon atoms and X is selected from the group consisting of the halogen atoms, and the hydrocarbyl radical —R", wherein R" is as defined above; and maintaining the resulting mixture at a temperature of from about —80° C. to about +100° C. for a period of time sufficient to polymerize said vinylphosphoryl compound.

2. The process according to claim 1 wherein the catalyst is butylmagnesium chloride.

3. The process according to claim 1 wherein the catalyst is ethylmagnesium chloride.

4. The process according to claim 1 wherein the catalyst is phenylmagnesium bromide.

5. The process according to claim 1 wherein the catalyst is vinylmagnesium chloride.

6. The process according to claim 1 wherein the catalyst is dibutylmagnesium.

7. The process for the polymerization of diphenylisopropenylphosphine oxide which comprises bringing said diphenylisopropenylphosphine oxide into admixture, in an inert atmosphere, with from about 0.5 to about 2 percent by weight thereof of butylmagnesium chloride, and maintaining the resulting mixture at a temperature of from about −80° C. to about 50° C. for a period of time sufficient to polymerize said vinyldiphenylphosphine oxide.

8. The process for the polymerization of dibutylvinylphosphine oxide which comprises bringing said dibutylvinylphosphine oxide into admixture, in an inert atmosphere, with from about 0.5 to about 2 percent by weight thereof of butylmagnesium chloride, and maintaining the resulting mixture at a temperature of from about −80° C. to about 50° C. for a period of time sufficient to polymerize said dibutylvinylphosphine oxide.

9. The process for the polymerization of diethylvinylphosphonodithioate which comprises bringing said diethylvinylphosphonodithioate into admixture, in an inert atmosphere, with from about 0.5 to about 2 percent by weight thereof of butylmagnesium chloride, and maintaining the resulting mixture at a temperature of from about −80° C. to about 50° C. for a period of time sufficient to polymerize said diethylvinylphosphonodithioate.

10. The process for the polymerization of diphenylvinylphosphonodithioate which comprises bringing said diphenylvinylphosphonodithioate into admixture, in an inert atmosphere, with from about 0.5 to about 2 percent by weight thereof of butylmagnesium chloride, and maintaining the resulting mixture at a temperature of from about −80° C. to about 50° C. for a period of time sufficient to polymerize said diphenylvinylphosphonodithioate.

11. A moldable homopolymer of a vinylphosphoryl compound of the formula:

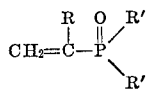

wherein R is selected from the group consisting of hydrogen and the methyl radical, and R' is selected from the group consisting of the saturated and olefinically unsaturated aliphatic and monocyclic aromatic hydrocarbyl and halogen-substituted hydrocarbyl radicals containing up to 8 carbon atoms, said homopolymer being prepared by the process which comprises bringing said vinylphosphoryl compound into admixture, in an inert atmosphere, with from about 0.1 to about 5 percent by weight thereof of catalyst of the formula:

R''MgX wherein R'' is selected from the group consisting of the saturated and olefinically unsaturated aliphatic and monocyclic aromatic hydrocarbyl radicals containing up to 8 carbon atoms and X is selected from the group consisting of the halogen atoms, and the hydrocarbyl radical —R'', wherein R'' is as defined above; and maintaining the resulting mixture at a temperature of from about −80° C. to about +100° C. for a period of time sufficient to polymerize said vinylphosphoryl compound.

References Cited

UNITED STATES PATENTS

| | | | |
|---|---|---|---|
| 3,043,821 | 7/1962 | Coover et al. | 260—80 |
| 2,365,466 | 12/1944 | Hamilton | 260—543 |
| 2,460,043 | 1/1949 | Teeters | 260—461.110 |
| 3,035,096 | 5/1962 | Cooper | 260—606.5 |
| 3,064,053 | 11/1962 | Rabinowitz | 20—606.5 |

FOREIGN PATENTS 1,234,456  10/1960  France.

OTHER REFERENCES

Tsetlin et al., Vysokomalekulyarnye Soedineniya 3, 117–1118 (1961) (See Chem. Abst., 56, (1962) p. 2568i).

HARRY WONG, JR., Primary Examiner

U.S. Cl. X.R.

117—124; 260—30.4, 32.6, 32.8, 33.4, 33.6, 33.8, 79.7, 82.1, 86.1, 88.1, 551, 606.5, 956, 973